United States Patent
Vailliencourt et al.

(10) Patent No.: US 6,277,321 B1
(45) Date of Patent: *Aug. 21, 2001

(54) METHOD OF FORMING WIDE-MOUTH, HEAT-SET, PINCH-GRIP CONTAINERS

(75) Inventors: Dwayne G. Vailliencourt, Manchester; Kerry W. Silvers, Chelsea, both of MI (US)

(73) Assignee: Schmalbach-Lubeca AG (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/058,372

(22) Filed: Apr. 9, 1998

(51) Int. Cl.⁷ ............................. B29C 49/08; B29C 49/16
(52) U.S. Cl. ...................... 264/529; 264/531; 264/532; 264/534
(58) Field of Search ...................... 264/529, 532, 264/531, 534; 215/384

(56) References Cited

U.S. PATENT DOCUMENTS

| | | | |
|---|---|---|---|
| D. 382,807 | * 8/1997 | Silvers et al. | D9/520 |
| 4,035,455 | * 7/1977 | Rosenkranz et al. | 264/532 |
| 4,177,239 | * 12/1979 | Gittner et al. | 264/530 |
| 4,465,199 | * 8/1984 | Aoki . | |
| 4,584,158 | * 4/1986 | Nilsson et al. | 264/529 |
| 5,261,544 | * 11/1993 | Weaver, Jr. | 215/1 C |
| 5,454,707 | * 10/1995 | Mitchell et al. | 246/532 |
| 5,472,105 | * 12/1995 | Krishnakumar et al. | 215/384 |

* cited by examiner

Primary Examiner—Jan H. Silbaugh
Assistant Examiner—Suzanne E McDowell
(74) Attorney, Agent, or Firm—Harness, Dickey & Pierce, P.L.C.

(57) ABSTRACT

A wide-mouth, hot-fill plastic container having pinch-grips and a high push-up base and method for forming the same. According to the method, a preform is positioned in a mold cavity defined in part by surfaces which deviate substantially inward to form pinch-grips in the resulting container. Initially, a mold base is located so that it defines an initial mold cavity whose length is greater than the final length of the container. The preform is axially stretched in the cavity to a length greater than the containers final length. After stretching the preform, the preform is generally expanded radially outward under low pressure. The mold bottom is then moved to a position where the length of the cavity is about the same as the final length of the container. The preform is further expanded under high pressure such that it contacts the molding halves thereby forming the finished container. As a result of the above method, the base and contact ring of the container is fully circumferentially formed below the pinch-grips. The container is also heat treated to allow for filling with a hot product.

12 Claims, 3 Drawing Sheets

METHOD OF FORMING WIDE-MOUTH, HEAT-SET, PINCH-GRIP CONTAINERS

BACKGROUND OF THE INVENTION

1. Field of the Invention

The present invention generally relates to methods for forming plastic containers. More specifically, the present invention relates to a method for forming a wide-mouth, heat-set plastic container having pinch-grips and a high push-up base.

2. Description of the Prior Art

As containers made of polyethylene terephthalate (PET), or other plastic resins which are capable of being used in hot-fill applications, become more widespread, there is a need to develop these hot-fill containers so as to be suitable for an ever wider variety of product applications.

In general, heat-set or hot-fill containers are those plastic containers capable of receiving a product therein while the product is at an elevated temperature, without any resulting deformation in the container. Containers of this variety are used in those situations where the product needs to be sterilized, pasteurized or otherwise heat treated prior to filling. Upon the introduction of the hot product into the container, if the container is not of a hot-fill variety, stresses in the material forming the container will cause the container to deform into an unacceptable end product. To be considered a hot-fill container, containers must be capable of withstanding filling temperatures of at least 150° F. and more typically 160°–180° F.

In forming a hot-fill container, PET or another suitable plastic resin is initially formed into a preform. This is most often done by an injecting molding method. Preforms all have a protypical structure which includes a mouth and a generally tubular body that terminates in a closed, typically rounded, end. Prior to being formed into containers, preforms in a softened state are transferred into a mold cavity configured in the shape of the desired container. Once in the mold cavity, the preforms are blow molded or stretch-blow molded into the desired container.

During the blow molding process, the plastic material is stretched and expanded so as to introduce an orientation (on the molecular level) into the material. The amount and location of orientation imparts various mechanical properties to the container. Generally, the higher the orientation, the less the container is capable of withstanding hot-fill temperatures. To increase the hot-fill capabilities of these oriented containers, the containers must be subsequently heat treated. The heat treatment, which can be one of several well known methods, increases the crystallinity of the material forming the container and this results in an increase in the container's thermal capabilities.

As hot-fill containers have evolved, various features have been found to increase the performance capabilities of the containers while other features have been found to enhance the usability of the containers. For example, from the performance side, hot-fill containers having deep or high push-up bases into the container cavity have been found to exhibit good mechanical and thermal properties in the base region. Specifically, the high push-up base helps to reduce the bottom roll-out which can occur after hot-filling and capping of the container. As the phrase is used herein, "high push-up base" is meant to include a base which has a domed portion that extends inwardly into the container to a height, generally measured on the exterior of the container from the contact ring of the base to the apex of the dome on the interior of the containers cavity, greater than approximately ⅜ inch and more typically ½ inch.

Another example of desired features in a hot-fill container are pinch-grips in the container's sidewall for easy grasping of the container.

Another desired feature for a hot-fill container is the incorporation of a large or wide-mouth into the container. Wide-mouth containers enable use of a spoon or other utensil to remove products, such as applesauce, from the container. As used herein, a wide-mouth container is generally defined as a container whose mouth has an outer diameter which is greater than approximately one-third of the outer diameter of the finished container or a mouth whose outer diameter is greater than approximately 1.5 inches.

While seen individually, the above features have not been heretofore incorporated together. As such, the novel container of the present invention may be referred to as a wide-mouth, high push-up, pinch-grip, heat-set container.

In attempting to blow molding of the aforementioned novel container, processing difficulties were encountered. These difficulties were of such a nature that no acceptable containers were formed until an equally novel method of molding the containers was developed by the present inventors.

The difficulty encountered in forming the containers was unexpectedly the result of the combination of the wide-mouth, wide body of the preform, a high push-up and the pinch-grips in the resultant container's sidewalls. The substantial indentations defining the pinch-grips in the mold were found to prevent the full formation of the base and chime areas, immediately below the pinch-grips, when a high push-up base was incorporated. It has been determined that this deficiency results from the plastic material expanding radially outward and axially downward to a point where it engages the indentations of the mold that define the pinch-grips. This contact occurs relatively early in the molding process and well before the material has been fully expanded downward onto the base and into the chime region. Once the material contacts the indentations, the material at least partially freezes and is thus restricted from being blown further down onto the base and into the chime region of the container. In addition to contact with the indentations of the mold, the material contacts the high push-up of the base mold before full expansion. This further restricts the material from being fully formed into the chime region. With less material being available for forming the base and chime regions, an incomplete or a non-uniform base was found to result. This leads to a functionally and aesthetically unacceptable container.

If a flat or a "low" push-up base is used, the inventors have found that the above difficulties mentioned above are not encountered. This is believed not to occur because the material does not contact the base mold until later in the molding process. However, as indicated earlier, a container with no or a low push-up base does not have optimum performance characteristics needed for hot-fill applications.

In view of the foregoing, it should be apparent that there exists a need for an improved wide-mouth container having pinch-grips and which is suitable for hot-fill applications. Equally, a need exists for a method of making such a container.

It is therefore a primary object of this invention to fulfill that need by providing a wide-mouth, high push-up, pinch-grip, heat-set container and a method for making such a container.

A further object of this invention is to provide a manufacturing method wherein such containers have a uniform and fully developed base.

SUMMARY OF THE INVENTION

Briefly described, these and other objects are accomplished according to the present invention by providing a heat-set container and method for forming a wide-mouth, pinch-grip container with a high push-up base. According to the method of the present invention, a preform having an already formed wide-mouth, is positioned in a mold cavity whose surfaces define the final shape of the desired container. The mold portions which define the container's sidewall include substantial inward deviations which will cause the pinch-grips of the resulting container to be deformed. The high push-up base of the container is defined by a base mold which is separate from the sidewall portions of the mold. Initially, the base mold is positioned so that it defines an initial mold cavity whose length is greater than the final length of the desired container. During molding, the preform is axially stretched or expanded to a length which is also greater than the length of the final container or cavity. During or after stretching of the preform, pressurized air is introduced into the container causing a partial pressurization of the preform which begins expanding the preform radially outward. Additionally, the mold bottom is moved in the direction of the preform's mouth, from an initial position into a final position. The final length of the cavity or container is defined from the mouth of the exterior surface of the base's apex. The preform is then fully expanded into contact with the mold surfaces to form the finished container.

Since the material which subsequently forms the base and chime area is radially expanded after the preform has been axially over-stretched, sufficient material will have been moved into the area below the pinch-grip indentations and laterally outward from the high push-up base mold allowing complete formation of the base and chime regions of the container directly below the pinch-grips. As a result of the above method, the base of the container is fully formed below the pinch-grips and an aesthetically and mechanically acceptable wide-mouth, high push-up, pinch-grip container is produced, which upon proper heat treating is capable of receiving a hot-fill product.

Additional benefits and advantages of the present invention will become apparent to those skilled in the art to which the present invention relates from the subsequent description of the preferred embodiment and the appended claims, taken in conjunction with the accompanying drawings.

BRIEF DESCRIPTION OF THE DRAWINGS

FIG. 3 is a side elevational view of an unacceptably formed container;

DETAILED DESCRIPTION OF THE PREFERRED EMBODIMENT

Figure 1:
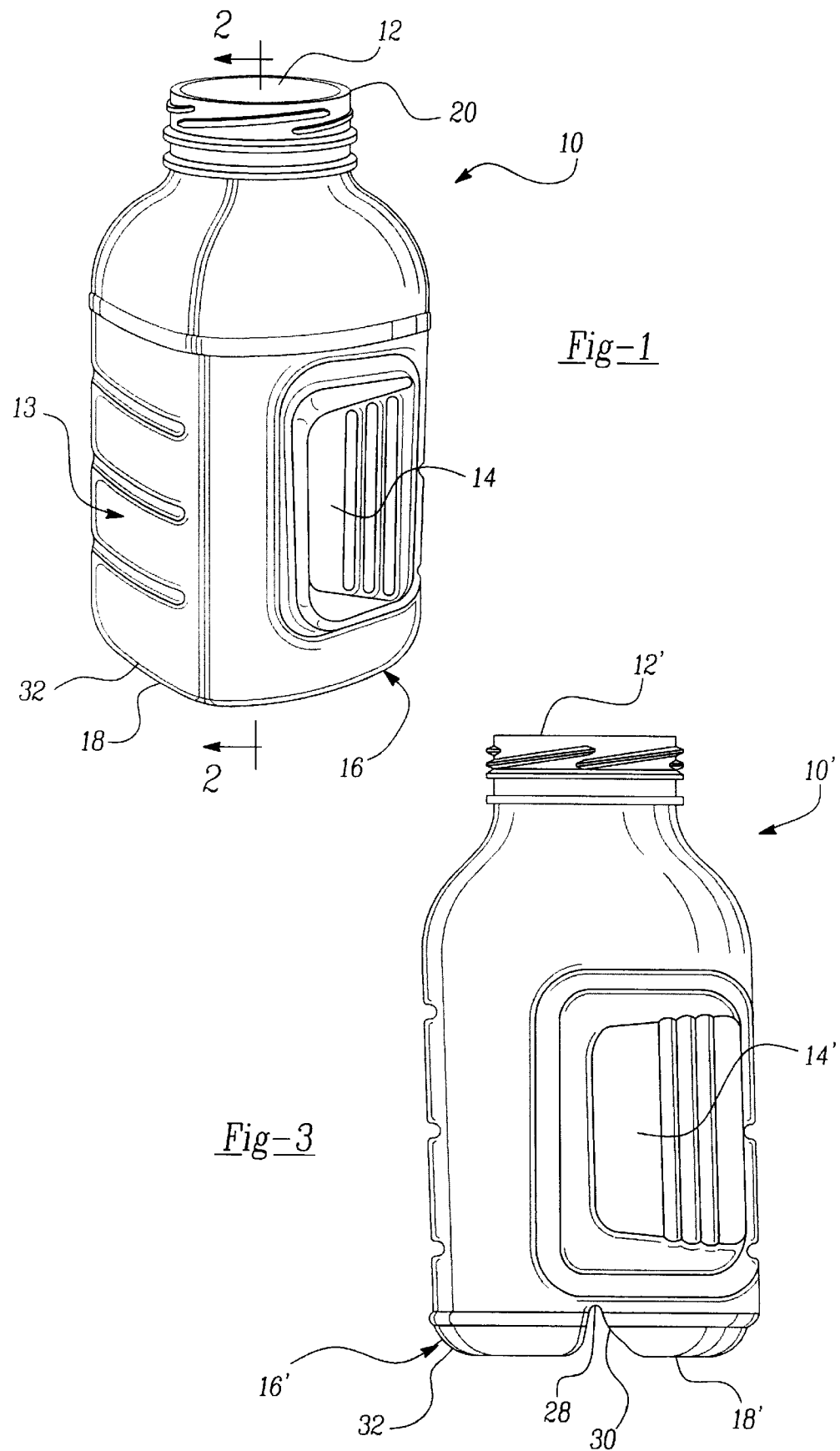
FIG. 1 is a perspective view of a container according to the present invention.
Figure 2:
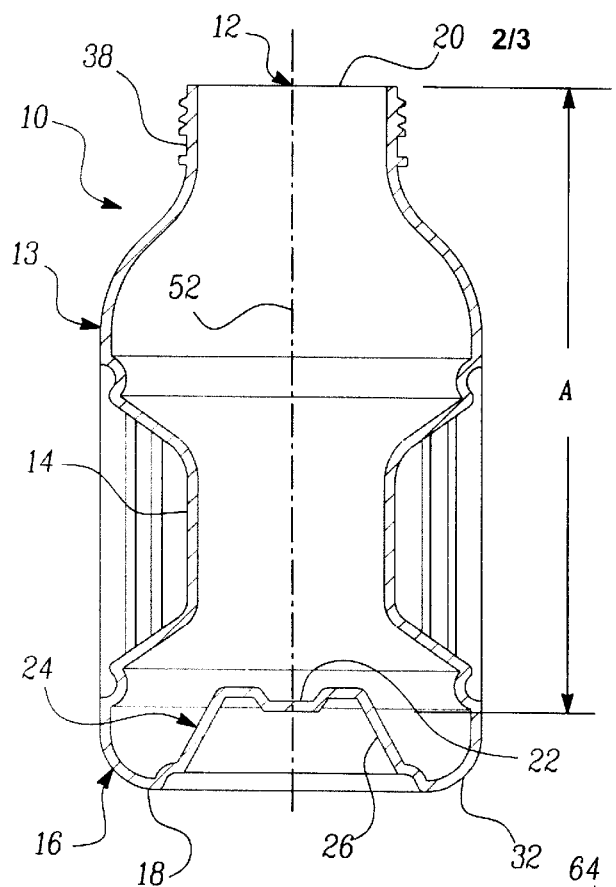
FIG. 2 is a cross-sectional view, taken generally along line 2—2 in FIG. 1, illustrating the fully formed base of the container.

Referring now in detail to the drawings, best seen in FIGS. 1 and 2 is a container 10 according to the present invention. The container 10 includes a wide-mouth 12 that merges into a generally rectangular or cylindrical sidewall 13 (rectangular being illustrated) that in turn merges into a base 16 which closes off the bottom of the container 10.

Formed on opposite sides of the sidewall 13 are a pair of pinch-grips 14. The pinch-grips 14 themselves represent substantial deviations into the container 10 and allow for easy gripping of the container 10, between the thumb and forefinger of one hand.

The base 16 of the container 10 has defined therein a uniform, contact ring 18 that circumscribes a high push-up 24. As seen in FIG. 2, the push-up 24 is generally dome shaped, protruding toward the interior of the container 10, with an inner wall 26 inclining upward toward an apex 22 generally defining the center of the base 16 and which is intersected by a longitudinal axis 23 through the container 10. The apex 22 of the container 10 further defines a nominal length A, measured between the exterior or bottom surface of the apex 22 and the rim 20 defining the mouth 12.

As mentioned previously, in developing the container 10 of this invention, processing problems which were encountered were heretofore unappreciated since the container 10 itself was not previously known. A major problem encountered by the present inventors was that when attempting to form the container 10 seen in FIGS. 1 and 2 by conventional methods, the resulting container had a non-uniform or incompletely formed base. Such a container 10' is seen in FIG. 3. The incomplete base 18' of the container 10' exhibited upward depressions or recesses 28, directly below the pinch-rips 14'. Such recesses 28 were unacceptable from both a functional and aesthetic standpoint. After significant analysis and the molding of containers with low push-ups, it was determined that the recesses 28 were a result of the preform material freezing against the protruding portions 48 and 54 of the mold 33 which define pinch-grips 14' and the push-up, this freezing occurring before an adequate amount of material had been blown or moved into the region below the protruding portion 48 and between the protruding portions 48 and 54. The recesses 28 further exhibited a downward tapering surface 30, extending to the contact ring 18' of the base 16'. This surface 30 was believed to be tapered because the depth of the protrusions 48 defining the pinch-grips 14' decrease in the lateral direction, allowing more material to move into the area between the protruding portions 48 and 54, supporting the present inventor's conclusions as to the cause of the recesses 28 themselves.

Figure 4:
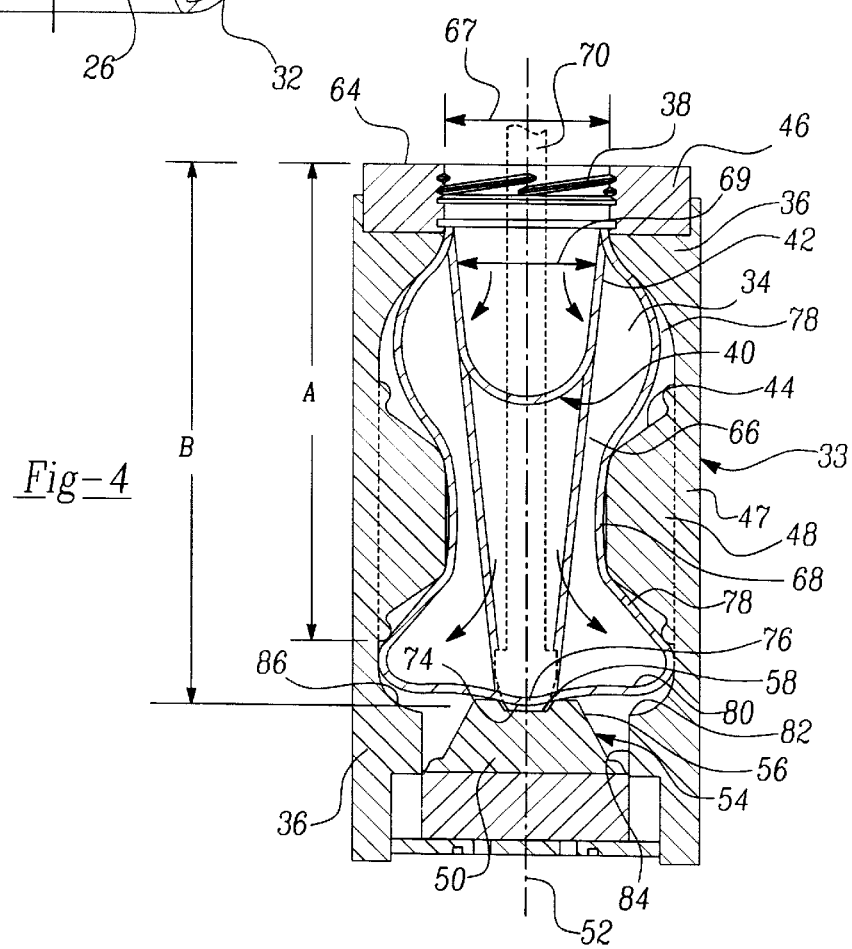
FIG. 4 is a cross-sectional view of a mold illustrating a stretch rod and preform during initial molding according to one aspect of the present invention, with the base mold in its initial position and the preform being axially over-stretched.
Figure 5:
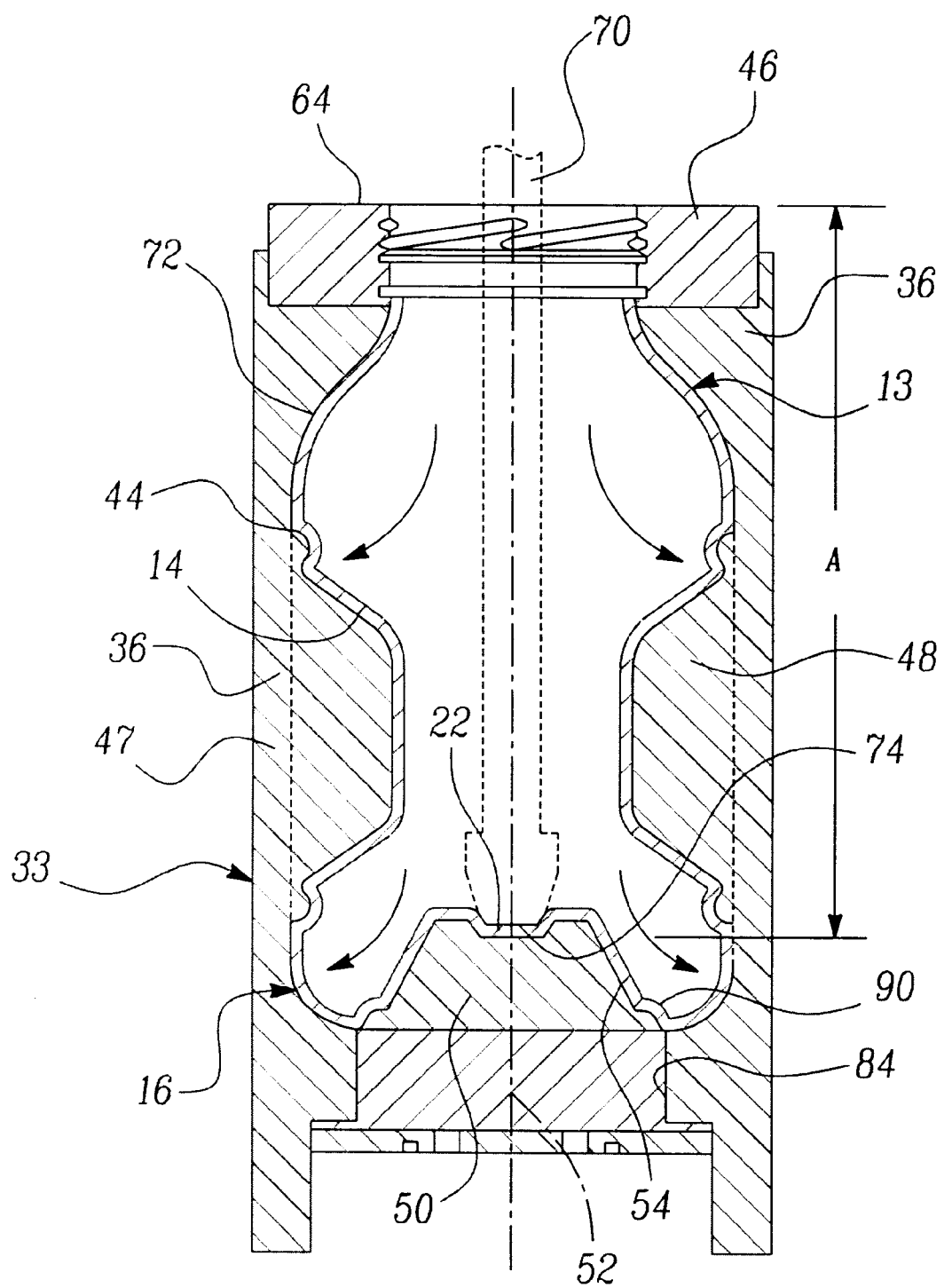
FIG. 5 is a cross-sectional view, similar to that of FIG. 4, during final molding of the container and showing the base mold having been moved into its final position.

Seen in FIGS. 4 and 5, the mold 33 includes surfaces defining a mold cavity 34 for forming the container 10 of the present invention. As further described below, the mold 33 includes additional features which enable the formation of the container 10 without the recesses 28' seen on the incomplete container 10' of FIG. 3.

The mold cavity 34 is defined by a pair of mold halves 36 that close upon one another to engage and retain the threaded neck finish 38 of a preform 40 therebetween. When retained in this manner, the body 42 of the preform 40 is suspended within the mold cavity 34. Each mold half 36 includes finish defining portions 46 and body defining portions 47, the latter of which include the pinch-grip defining protruding portions 48 as substantial deviations into the cavity 34.

The base 16 of the container 10 is defined in part by the body defining portions 47 and in part by the base mold 50.

The base mold 50 includes a protruding portion, having a bottom molding surface 54, that causes formation of the push-up 24 in the finished container 10. Complimentary to the push-up 24, the bottom molding surface 54 is generally dome shaped with an inner wall 56 inclining upward toward an apex 58.

To overcome the problems discussed above, the base mold 50 is constructed to be axially movable from an initial or first position (shown in FIG. 4) to a final or second position (shown in FIG. 5) during the blow molding method of the present invention. The initial position defines the initial configuration of the mold cavity 34 such that an initial length B is defined between the top 64 of the neck ring 46, which engages the neck finish 38, and the apex 58 of the base mold 50. The final position of the base mold 50 accordingly defines the shorter length A, mentioned above relative to the container 10, which corresponds to the length between the top 64 of the neck ring 46 and the apex 58.

In molding the container 10 of the present invention, the first step of this inventive method is to provide a wide-mouth preform 40 which can be stretched and blown into the finished container 10. FIG. 4 includes a representation of the various stages through which the preform 40 progresses during the blow molding process of the present invention. The un-stretched preform 40, an over-stretched preform 66, and a partially blown container 68 are all illustratively shown in FIG. 4. The preform 40 is for a wide-mouth container and can be seen to have a mouth 38 with a diameter 67 that is generally larger than the average diameter 69 of its body 42. In a stretchable condition, the preform 40 is positioned in the neck ring 46 so that its body 42 is suspended within the mold cavity 34.

With the base mold 50 retracted (its initial position), a stretch rod 70, or other means to axially stretch the preform, is positioned within the preform 40 and advanced along an axis corresponding to the axis 52 of the container 10. In this manner the unstretched preform 40 is axially stretched to form an over-stretched preform 66 with a length greater than A and approximately equal to B. The stretch rod 70 may be fully advanced so that it clamps a closed end 76 of the over-stretched preform 66 between an end 74 of the stretch rod 70 and the apex 58 of the base mold 50 while the mold base 50 is either in its initial position or in an intermediate position between the initial and final positions. The need for and timing of the clamping of the preform between the stretch rod 70 and base 50 will vary depending on the exact design characteristics, including weight, of the particular container 10 being molded. FIG. 4 can accordingly be viewed as representing the base mold 50 in either its initial position or the intermediate position.

A blow medium, such as air, at a predetermined pressure is introduced into the cavity 34 to initially expand the preform 66 radially outward. The blow medium can be initiated during the over-stretching step or immediately after the completion of the over-stretching step. The exact timing of the introduction of the blow medium will be Ace dependent on the specific design characteristics of the desired container.

With the base mold 50 is in its initial position, the bottom molding surface 54 is spaced farther away from the protruding portions 48 than when the base mold 50 is in its final position. Because of the enlarged gap between bottom molding surface 54 and the protruding portions 48, the bottom most portions of the over-stretched preform 66 are free to be expanded or moved radially outward and generally fully into the chime defining area 82 of the mold 33, particularly directly beneath the indentations 48, without being restricted by early freezing of the plastic material.

Following a predetermined amount of time for the blowing medium to expand the stretched preform 66 into the partially blown container 68, the base mold 50 is then moved into its final position. During this movement, the stretch rod 70 is retracted at a rate corresponding to advancement of the base mold 50. This ensures that the end 76 of the over-stretched preform 66 is and remains clamped against the base mold 50, preventing shifting or movement of the over-stretched preform 66 and the formation of an unacceptable container. The timing delay between the first blowing process and the moving of the mold base 50 is critical to the success of the process and full formation of the container 10. If the delay is too great, too much material may be blown outward and material may actually freeze in the pathway 84 that allows for movement of the base mold 50. On the other hand, if the base mold 50 is moved too early, an insufficient amount of material will be moved into the base 86 and chime 82 defining areas of the mold cavity 34, resulting in the recess 28' mentioned above. It has been found that in order to properly form a 48 ounce, square wide-mouthed container 10 with a high push-up 24 and pinch-grips 14 requires the blow medium to be applied for approximately 0.55 seconds, after over-stretching and before movement of the base mold 50. Obviously, the appropriate timing prior to the movement of the base mold 50 will be dictated by the actual design characteristics of the particular container and will accordingly vary.

After blowing the material into the base and chime area, the next step in the molding process is to blow the preform 40 into substantial conformity with the mold cavity 34. This is done preferably after the base mold 50 has been moved into its final position 62 and the mold cavity 34 is in its final molding configuration. However, it may be initiated prior to the base mold 50 actually reaching that final position if sufficient material has been moved into the baselchime area. The result of the application of the latter pressure is generally shown in FIG. 5. In that figure, the sidewalls 13 and base 16 of the fully blown container 10 are seen as being fully expanded so that they substantially conform with the side molding surfaces 44, 54 of the mold halves 36 and the base mold 50. As used herein, "substantial conformity" means conformity sufficient to produce an acceptable resultant container. During this latter application of blowing medium, the stretch rod 70 continues to clamp a portion, the apex 22, of the blown container 10 between the end 74 of the stretch rod 70 and the apex 58 of the base mold 50. At this point, the fully blown container 10 has a final length A, measured from the rim 20 of the mouth 12 to the apex 22 of the base 16. If desired, venting of the blow medium can be accomplished through the stretch rod 70 for added cooling.

Alternatively, the blowing medium can be provided at a constant pressure or at different pressures during the molding cycle. For example, during axial stretching of the preform 40, the blowing medium may be provided at a pressure which is less than the pressure applied when the preform 40 is blown into substantial conformity with the surfaces defining the final configuration of the mold cavity. The lower pressure may be ambient or greater than ambient but less than the subsequent "high" pressure.

The final steps of the present method are the opening of the mold halves 36 and the retraction of the base mold 50 allowing for removal of the finished container 10 from the mold cavity 34. The container 10 produced by the present method has a completely formed push-up 24 and a continuous circumferential contact ring 18, particularly directly beneath the pinch-grips 14. The blown container 10 is then be heat treated according to conventional methods to permit its use in hot-fill applications.

While the above description constitutes the preferred embodiment of the present invention, it will be appreciated that the invention is susceptible to modification, variation and change without departing from the proper scope and fair meaning of the accompanying claims.

What is claimed is:

1. A method of operating a molding machine to form a plastic container having a sidewall with a deep pinch-grip and a base with a high push-up, said method comprising the steps of:

providing a preform having a generally tubular body with an average diameter, a wide-mouth at one end with a wide-mouth diameter generally larger than the average diameter, and a closed end at one other end;

providing a mold having side molding surfaces defining a protruding portion protruding to a depth approximating the wide-mouth diameter to cause formation of the deep pinch-grip, and a bottom molding surface defining a protruding portion to cause formation of the high push-up;

positioning and retaining the preform in the mold;

axially stretching the preform toward the bottom molding surface;

introducing a first blowing medium into the preform to expand the preform in a controlled manner such that an amount of material extends into a portion of the mold below the protruding portion of the side molding surfaces and such that the body of the preform does not completely conform to the side molding surfaces;

moving the bottom molding surface toward the wide-mouth of the preform;

introducing a second blowing medium into the preform to expand the preform so that the material below the protruding portion of the side molding surfaces at least substantially conforms to the side molding surfaces and the bottom molding surface to thereby complete the formation of the sidewall and the base of the container; and removing the container from the mold.

2. The method of claim 1 wherein said axially stretching includes axially stretching the preform with a stretch rod.

3. The method of claim 1 further comprising clamping the closed end of the preform between a stretch rod and the bottom molding surface.

4. The method of claim 3 wherein said moving includes moving the bottom molding surface toward the wide-mouth of the preform while clamping the closed end of the preform between the stretch rod and the bottom molding surface.

5. The method of claim 1 wherein said introducing a second blowing medium includes introducing a second blowing medium at a greater pressure than the pressure of the first blowing medium.

6. The method of claim 1 wherein said introducing a second blowing medium includes introducing a second blowing medium at a pressure approximately equal to the pressure of the first blowing medium.

7. The method of claim 1 wherein said introducing a first blowing medium occurs before the completion of said axially stretching the preform.

8. The method of claim 1 wherein said introducing a first blowing medium occurs after the completion of said axially stretching the preform.

9. The method of claim 1 wherein said introducing a first blowing medium occurs after initiation of said moving the bottom molding surface.

10. The method of claim 1 wherein said introducing a first blowing medium occurs before completion of said moving the bottom molding surface.

11. The method of claim 1 wherein said introducing a second blowing medium occurs after completion of said axially stretching the preform.

12. The method of claim 1 wherein said introducing a second blowing medium occurs after completion of said moving the bottom molding surface.

* * * * *